(12) United States Patent
White, III

(10) Patent No.: US 11,649,732 B2
(45) Date of Patent: May 16, 2023

(54) VANE ASSEMBLY WITH SPRING DEVICE FOR BIASING MATE FACE SEAL

(71) Applicant: RAYTHEON TECHNOLOGIES CORPORATION, Farmington, CT (US)

(72) Inventor: Robert A. White, III, Meriden, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/198,415

(22) Filed: Mar. 11, 2021

(65) Prior Publication Data
US 2022/0290569 A1  Sep. 15, 2022

(51) Int. Cl.
| | | |
|---|---|---|
| *F01D 11/00* | (2006.01) | |
| *F01D 5/20* | (2006.01) | |
| *F02C 7/28* | (2006.01) | |

(52) U.S. Cl.
CPC ............. *F01D 5/20* (2013.01); *F01D 11/005* (2013.01); *F02C 7/28* (2013.01); *F05D 2240/12* (2013.01); *F05D 2240/307* (2013.01); *F05D 2240/57* (2013.01); *F05D 2240/80* (2013.01)

(58) Field of Classification Search
CPC ....... F01D 5/20; F01D 11/005; F05D 2240/57
See application file for complete search history.

(56) References Cited

U.S. PATENT DOCUMENTS

| 6,296,443 | B1 | 10/2001 | Newman et al. |
|---|---|---|---|
| 6,418,727 | B1* | 7/2002 | Rice ................. F01D 9/023 60/799 |
| 7,090,224 | B2* | 8/2006 | Iguchi ............. F01D 11/005 277/637 |
| 7,788,932 | B2* | 9/2010 | Kunitake ............. F02C 7/28 60/797 |
| 8,069,673 | B2* | 12/2011 | Kunitake ............. F02C 7/28 60/797 |
| 10,428,663 | B2 | 10/2019 | Propheter-Hinckley |
| 10,443,417 | B2 | 10/2019 | Fitzpatrick et al. |
| 10,767,497 | B2 | 9/2020 | Vetters et al. |

(Continued)

FOREIGN PATENT DOCUMENTS

| DE | 102013205028 | 9/2014 |
|---|---|---|
| EP | 1832716 | 9/2007 |

(Continued)

OTHER PUBLICATIONS

European Search Report for European Patent Application No. 22161717.8 dated Aug. 12, 2022.

*Primary Examiner* — Eldon T Brockman
(74) *Attorney, Agent, or Firm* — Carlson, Gaskey & Olds, P.C.

(57) ABSTRACT

An assembly includes first and second core gaspath walls. Each of the core gaspath walls defines a core gas path side and a non-core gas path side. The first and second core gaspath walls are arranged next to each other and define a gap therebetween. There is a seal arranged on the non-core gas path side that bridges over the gap to seal the gap. A spring device has a plurality of spring elements. The spring elements bias the seal against the non-core gas path sides of the first and second core gaspath walls.

16 Claims, 5 Drawing Sheets

(56) References Cited

U.S. PATENT DOCUMENTS

| | | | |
|---|---|---|---|
| 2005/0082768 A1* | 4/2005 | Iguchi | F16J 15/0887 277/345 |
| 2007/0212214 A1* | 9/2007 | Paauwe | F02C 7/28 415/170.1 |
| 2009/0072497 A1* | 3/2009 | Kunitake | F02C 7/28 277/644 |
| 2010/0201080 A1* | 8/2010 | Kunitake | F02C 7/28 277/641 |

FOREIGN PATENT DOCUMENTS

| | | |
|---|---|---|
| EP | 3620612 | 3/2020 |
| WO | 2018048390 | 3/2018 |

\* cited by examiner

VANE ASSEMBLY WITH SPRING DEVICE FOR BIASING MATE FACE SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An assembly according to an example of the present disclosure includes first and second core gaspath walls. Each of the core gaspath walls defines a core gas path side and a non-core gas path side. The first and second core gaspath walls are arranged next to each other and defining a gap therebetween. A seal arranged on the non-core gas path side bridges over the gap to seal the gap. A spring device has a plurality of spring elements. The spring elements bias the seal against the non-core gas path sides of the first and second core gaspath walls.

In a further embodiment of any of the foregoing embodiments, the spring elements are finger springs.

In a further embodiment of any of the foregoing embodiments, each of the finger springs includes a base portion, a finger portion, and an acute elbow portion connecting the base portion and the finger portion.

In a further embodiment of any of the foregoing embodiments, the base portion includes a downturned tab that abuts the acute elbow portion of an adjacent one of the finger springs.

In a further embodiment of any of the foregoing embodiments, the finger portion is planar.

In a further embodiment of any of the foregoing embodiments, the finger section includes a tip end having a bearing surface.

In a further embodiment of any of the foregoing embodiments, the finger springs are arranged as two oppositely-oriented groups.

In a further embodiment of any of the foregoing embodiments, the finger springs are arranged as a single, commonly oriented group.

In a further embodiment of any of the foregoing embodiments, the finger springs are bonded to a common backing plate.

In a further embodiment of any of the foregoing embodiments, the finger springs are rotationally self-constraining such that one of the finger springs rotationally constrains a next adjacent one of the finger springs.

A further embodiment of any of the foregoing embodiments includes support hardware that defines a slot in which the spring device is disposed, the slot including a tang retaining the spring device.

A further embodiment of any of the foregoing embodiments includes support hardware that defines a slot in which the spring device is disposed. The slot includes a keystone element limiting rotation of the spring elements.

A further embodiment of any of the foregoing embodiments includes an additional seal underlapping the seal such that the spring device biases the additional seal via the seal.

In a further embodiment of any of the foregoing embodiments, the first and second core gaspath walls are platforms of first and second airfoil fairings.

A gas turbine engine according to an example of the present disclosure includes a compressor section, a combustor in fluid communication with the compressor section, and a turbine section in fluid communication with the combustor. The turbine section has a vane assembly disposed about a central axis of the gas turbine engine. The vane assembly has first and second airfoil fairings. Each of the first and second airfoil fairings have a fairing platform and an airfoil extending therefrom. Each of the fairing platforms defines a core gas path side and a non-core gas path side. The first and second airfoil fairings are arranged next to each other such that the fairing platforms define a gap therebetween. A seal is arranged on the non-core gas path side. The seal bridges over the gap to seal the gap, and a spring device has a plurality of spring elements. The spring elements bias the seal against the non-core gas path sides of the airfoil fairings.

In a further embodiment of any of the foregoing embodiments, the spring elements are finger springs, and each of the finger springs includes a base portion, a finger portion, and an acute elbow portion connecting the base portion and the finger portion.

In a further embodiment of any of the foregoing embodiments, the base portion includes a downturned tab that abuts the acute elbow portion of an adjacent one of the finger springs, and the finger section includes a tip end having a bearing surface.

In a further embodiment of any of the foregoing embodiments, the finger springs are bonded to a common backing plate.

In a further embodiment of any of the foregoing embodiments, the finger springs are rotationally self-constraining such that one of the finger springs rotationally constrains a next adjacent one of the finger springs.

A spring device according to an example of the present disclosure includes a plurality of finger springs. Each of the finger springs include a base portion, a finger portion, and an acute elbow portion connecting the base portion and the finger portion. The base portion includes a downturned tab that abuts the acute elbow portion of an adjacent one of the finger springs.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
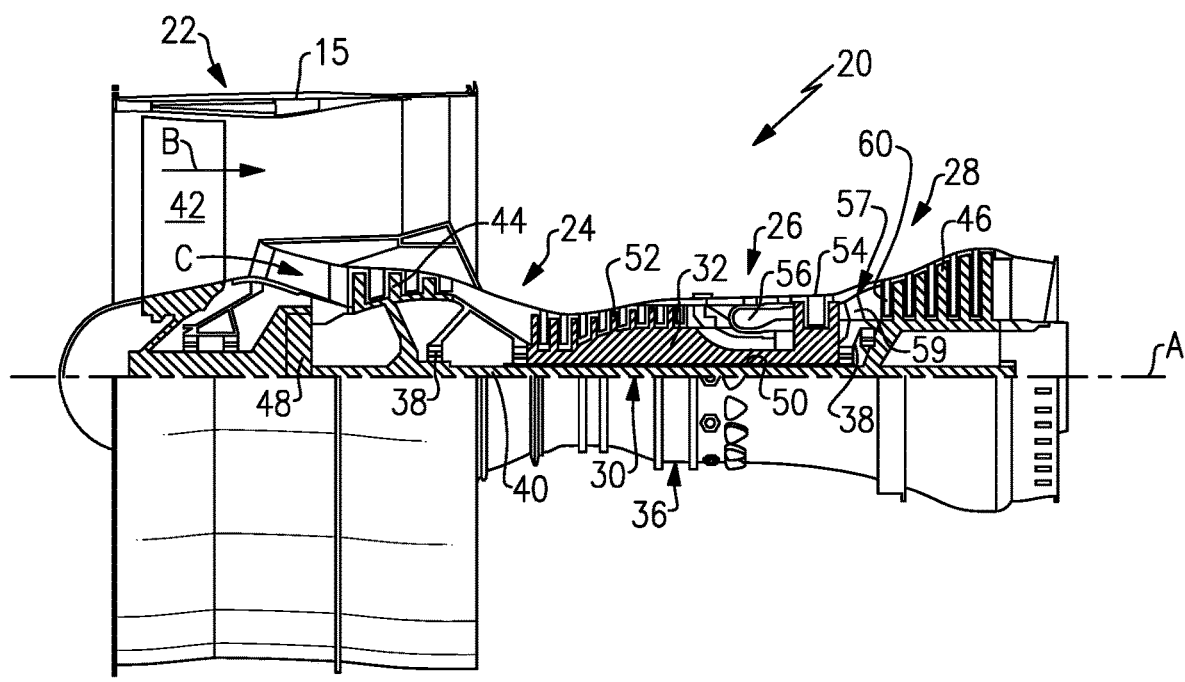
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
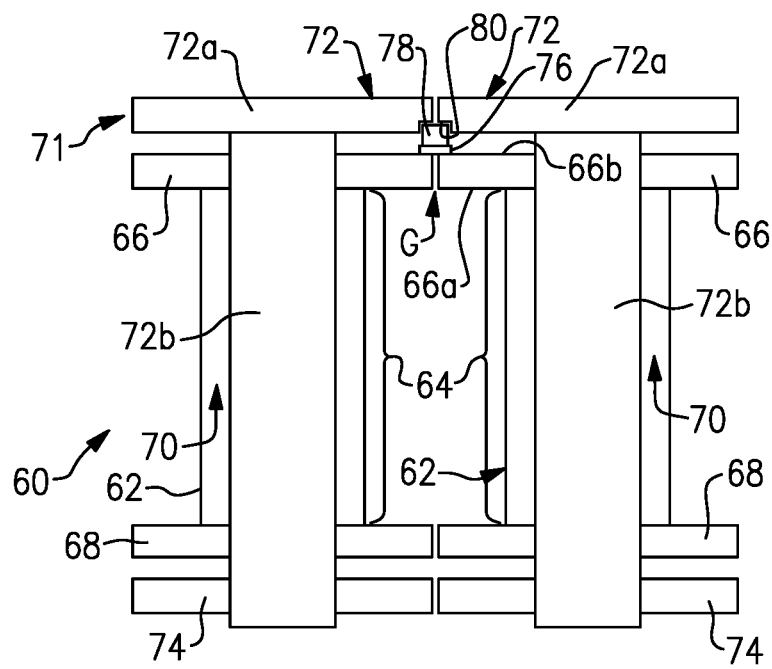
FIG. 2 illustrates an assembly of the engine.

FIG. 2 illustrates a line representation of an axial view of an assembly 60 from the turbine section 28 of the engine 20 (see also FIG. 1) to demonstrate an example implementation of a spring device 78. It is to be understood that although the examples herein are discussed in context of a vane from the turbine section, the spring device 78 can be applied to other components such as, but not limited to, blade outer air seals, other core gaspath walls, or components that would benefit from spring biasing.

In the illustrated implementation, the assembly 60 includes first and second airfoil fairings 62. Each airfoil fairing 62 is comprised of an airfoil section 64 and first and second platforms 66/68 between which the airfoil section 64 extends. The airfoil section 64 generally extends in a radial direction relative to the central engine axis A. Terms such as "inner" and "outer" used herein refer to location with respect to the central engine axis A, i.e., radially inner or radially outer. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

The airfoil fairings 62 are continuous in that the platforms 66/68 and airfoil section 64 constitute a unitary body. As an example, the airfoil fairings are formed of a ceramic matrix composite, an organic matrix composite (OMC), or a metal matrix composite (MMC). For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum. A fiber tow is a bundle of filaments. As an example, a single tow may have several thousand filaments. The tows may be arranged in a fiber architecture, which refers to an ordered arrangement of the tows relative to one another, such as, but not limited to, a 2D woven ply or a 3D structure. Alternatively, the airfoil fairing 62 may be formed of a homogenous polymer, metal alloy, or ceramic material.

The airfoil section 64 circumscribes an interior through-cavity 70. The airfoil section 64 may have a single through-cavity 70, or the cavity 70 may be divided by one or more ribs. The airfoil fairings 62 are mechanically supported by support hardware, generally shown at 71. In this example, the support hardware 71 includes spars 72. Each spar 72 includes a spar platform 72a adjacent the airfoil platforms 66 and a spar leg 72b that extends from the spar platform 72a into the respective through-cavity 70. Although not shown, the spar platform 72a includes attachment features that secure it to a fixed support structure, such as an engine case. The spar leg 72b may include an interior through-passage for transmitting cooling air to downstream locations.

The spar legs 72b extend past the platforms 68 of the airfoil fairings 62 so as to protrude from the airfoil fairings 62. The support hardware 71 in this example additionally includes a support platform 74 adjacent the platforms 68 of the airfoil fairings 62. Although not shown, the support platforms 74, the platforms 66/68 of the airfoil fairings 62, and the spar platform 72a may have flanges or other mating features through which the fairing platforms 66/68 interface with the platforms 72a/74 to react out aerodynamic loads.

The ends of the spar legs 72b are secured to the support platforms 74. For example, the ends of the spar legs 72b have a clevis mount that includes two spaced-apart prongs that have aligned holes, and there is a pin that extends through the holes. The pins prevent the spar legs 72b from being retracted through the support platform 74, thereby locking the support platforms 74 to the spar legs 72b and trapping the airfoil fairings 62 between the spar platforms 72a and the support platforms 74. It is to be understood that other mechanisms may alternatively be used to lock the spar legs 72b with the support platforms 74. Moreover, the example configuration could also be inverted, with the spar platform 72a being adjacent the platform 68 and the support platform 74 being adjacent the platform 66.

Turning again to the airfoil fairings 62, each of the fairing platforms 66 is a core gaspath wall that defines a core gas path side 66a and a non-core gas path side 66b. The airfoil fairings 62 are arranged circumferentially next to each other such that the fairing platforms 66 define a gap G therebetween. There is a seal 76, such as a feather seal, arranged on the non-core gas path sides 66b. The seal 76 bridges over the gap G to seal the core gas path from the space between the fairing platforms 66 and the spar platforms 72a. The surfaces of the fairing platforms 66 that are in contact with the seal 76 may include a coating, for thermal considerations, to smooth the surface for better sealing contact with the seal 76, and/or reduce wear. For example, the coating is selected of a composition that is thermally insulating in comparison to the CMC (if used) of the airfoil fairings, to thermally insulate the seal 76. The coating may be composed of elemental silicon, silicate, silica, hafnia, zirconia, or combinations thereof. The spring device 78 is located adjacent the seal 76. The spring device 78 is retained in a slot 80 in the spar platforms 72a, but other support structure than the spar platform 72a may be used in implementations of the spring device 78 in other components.

The spring device 78 biases the seal 76 against the non-core gas path sides 66a of the airfoil fairings 66 to facilitate sealing of the seal 76 against the non-core gas path sides 66a. The biasing also facilitates attenuation of radial tolerances in the assembly in that dimensional variations in the components is taken up by compression of the spring device 78. Moreover, the biasing also facilitates proper positioning of the components during assembly, idle, and engine shut-down by urging the airfoil fairings 62 toward the support platforms 74. As will be appreciated, a seal 76 and a spring device 78 may also be provided, or alternatively be provided, at the gap between the fairing platforms 68. Moreover, it is also contemplated that the spring device 78 be used without the seal 76, to serve the tolerance and positioning functions.

Figure 3:
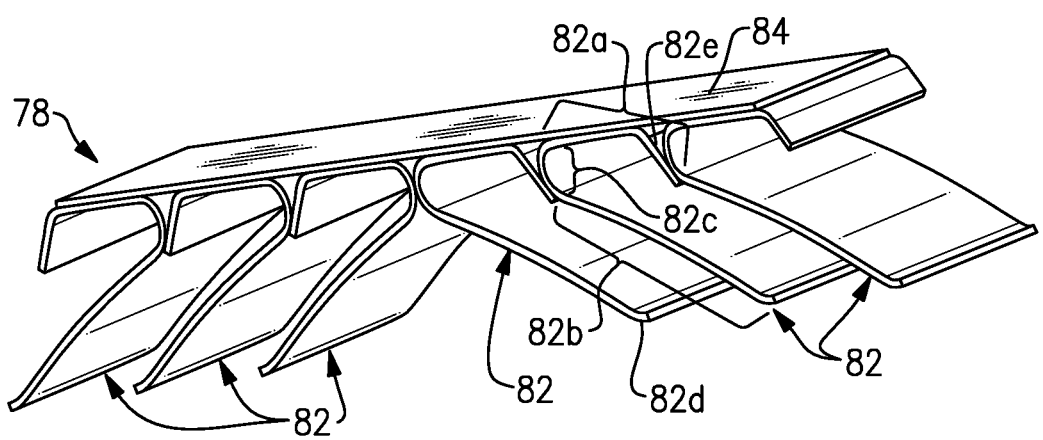
FIG. 3 illustrates a spring device of the assembly.

FIG. 3 illustrates an isolated view of an example of the spring device 78. The spring device 78 is generally axially elongated and, relative to FIG. 2, runs axially along the seal 76 (perpendicular to the plane of FIG. 2). The spring device 78 includes a plurality of spring elements 82 that serve to provide the bias force on the seal 76. In this example, the spring elements 82 are finger springs. For example, the finger springs 82 are formed of sheet metal, but could alternatively be formed by casting, additive manufacturing, or other process. A "finger spring" is generally a curved elongated body that is elastically flexible under the applied loads. In this example, each of the finger springs 82 includes a base portion 82a, a finger portion 82b, and an acute elbow portion 82c that connects the base portion 82a and the finger portion 82b. The base portion 82a is bonded to a common backing plate 84, such as by welding or other metallurgical bonding. The backing plate 84 is received in to the slot 80 in the spar platforms 72a to retain the spring device 78 in place.

The finger portion 82b in this example is substantially planar. The tip end of the finger portion 82b turns so as to form a bearing surface 82d that bears against the seal 76 (or other structure if a seal is not used). The bearing surface 82d provides an area contact over which the spring force is distributed, as opposed to a point or line of contact that would otherwise concentrate the force. The distribution of the force serves to facilitate reduction in wear and stress loads on the seal 76.

The acute elbow portion 82c includes a turn that serves as a transition between the base portion 82a and the finger portion 82b. The turn is acute in that an angle defined between the base portion 82a that lies flat against the backing plate 84 and the finger portion 82b is less than 90°. The acute elbow portion 82c serves as a flexible joint between the base portion 82a and the finger portion 82b such that when compressed between the spar platforms 72a and the fairing platforms 66, the finger springs 82 deflect about the acute elbow portions 82c.

In this example, the finger springs 82 are arranged as two oppositely-oriented groups. For instance, the three finger springs 82 on the left-hand side in FIG. 3 form a first group and the three finger springs 82 on the right-hand side form a second group. The finger springs 82 of the first group are oriented such that the acute elbow portions 82*c* open toward the left and the finger springs 82 of the second group open toward the right. The base portions 82*a* each include a downturned tab 82*e* that abuts the acute elbow portion 82*c* of the adjacent one of the finger springs 82 of the group. Thus, in the depicted configuration, the acute elbow portion 82*c* of the middle one of the finger springs 82 nests with the tab 82*e* of the inner-most one of the finger springs 82, and the acute elbow portion 82*c* of the end one of the finger springs 82 nests with the tab 82*e* of the middle one of the finger springs 82. The two inner-most ones of the finger springs 82 of the groups are situated back-to-back such that the acute elbow portions 82*c* abut one another.

Such a configuration facilitates rotational stabilization of the finger springs 82. For instance, compression of the spring device 78 causes the bearing surfaces 82*d* to apply force on the seal 76. Each of the finger springs 82 flexes about its acute elbow portion 82*c*, causing a rotation moment there about. However, with the aforementioned nesting, the tab 82*e* supports the acute elbow portion 82*c* of the next finger spring 82 to thereby stabilize the finger spring 82 against rotation. Such loads may ultimately be transmitted to the middle ones of the finger springs 82 where they oppose and substantially cancel due to the opposed orientation of the back-to-back acute elbow portions 82*c*. Moreover, should one of the finger springs 82 dislodge from the backing plate 84, the above nesting may also facilitate maintaining the dislodged finger spring 82 in position. Any portions of the spring device 78 that are in friction contact, such as the bearing surfaces 82*d* and/or acute elbows 72*c*, may be provided with a lubricious coating. For example, the lubricious coating may be, but is not limited to, graphite, chromium carbide, chromia, or alumina.

Figure 4:
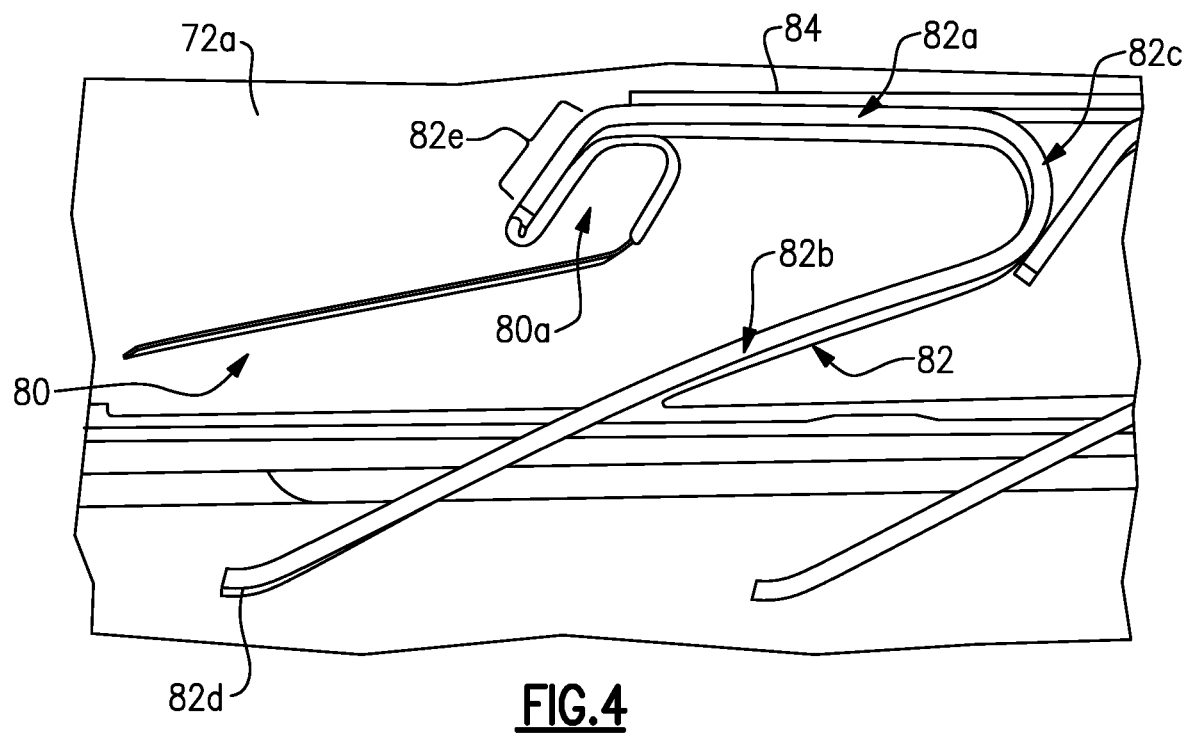
FIG. 4 illustrates a tang in a slot in which the spring device is received.

As shown in the further example in FIG. 4, the slot 80 may additionally include a tang 80*a* that projects into the open space in the slot 80. The tang 80*a* serves to capture the tab 82*e* of the end one of the finger springs 82 to facilitate retaining the spring device 78 in the slot 80. The tang 80*a* may also serve as an anti-rotation feature against the tendency of the finger springs 82 to rotate when under compression.

Figure 5:
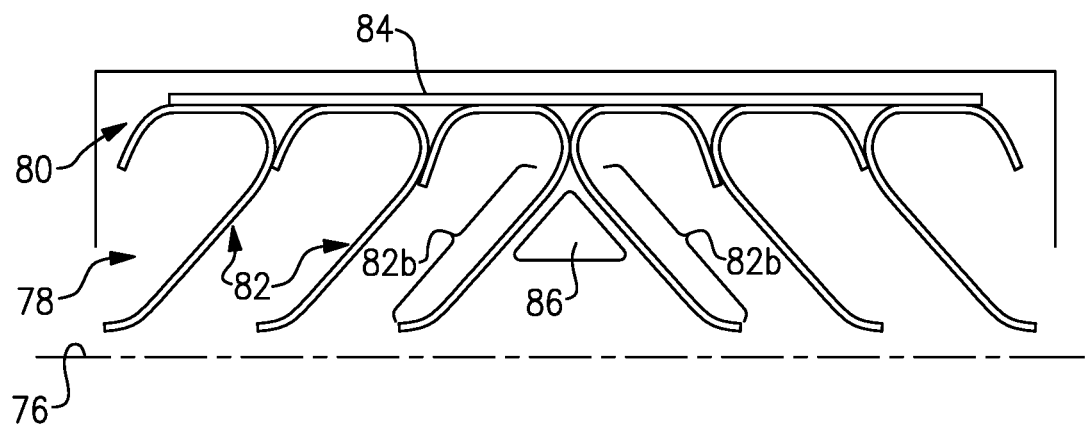
FIG. 5 illustrates a keystone element in a slot in the which the spring device is received.

FIG. 5 illustrates a further example in which the slot 80 additionally includes a keystone element 86. The keystone element 86 is a projection in the slot 80 that extends between the inner-most ones of the finger springs 82. In this example, the keystone element 86 is substantially triangular in cross-section and extends between the adjacent finger portions 82*b* of the inner-most ones of the finger springs 82 such that the sides of the triangular cross-section bear against the finger portions 82*b*. The keystone element 86 serves as a further anti-rotation feature against the tendency of the finger springs 82 to rotate when under compression. For instance, under compression, the right-hand one of the inner-most finger spring 82 has a tendency to rotate counter-clockwise in the illustrated example. However, since the side of the keystone element 86 bears against the finger portion 82*b*, the keystone element 86 limits the deflection of the finger spring 82 and its ability to rotate in place. Likewise, the keystone element 86 also limits the left-hand side one of the inner-most finger springs 82. Moreover, as the loads of the groups of the finger springs 82 are transmitted to the inner-most finger springs 82, the keystone element 86 may also indirectly serve for anti-rotation of the middle and outer ones of the finger springs 82.

Figure 6:
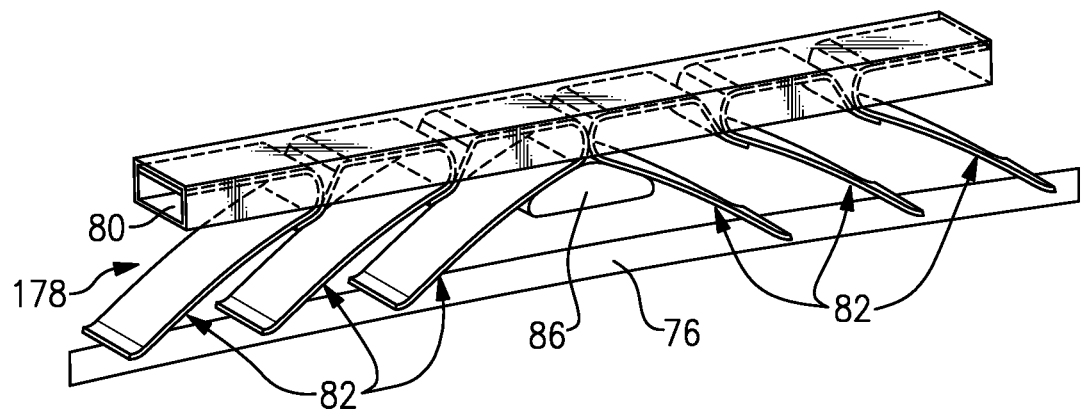
FIG. 6 illustrates a spring device in which the spring fingers are not commonly affixed with a backing plate.

FIG. 6 illustrates another example spring device 178. In this disclosure, like reference numerals designate like elements where appropriate and reference numerals with the addition of one-hundred or multiples thereof designate modified elements that are understood to incorporate the same features and benefits of the corresponding elements. Here, the spring device 178 is the same as the spring device 78 except that it excludes the common backing plate 84. In this regard, the finger springs 82 are provided as individual, separate pieces that are not commonly affixed. Although the finger springs 82 in this example a free-floating relative to one another, the compression of the finger springs 82 between the slot 80 and the seal 76 serves to maintain the finger springs 82 in place. Moreover, due to the aforementioned nesting via the tabs 82*e* and acute elbow portions 82*c*, the finger springs 82 are rotationally self-constraining. In this example, the keystone element 86 addition facilitates maintaining the finger springs 82 in place by supporting the inner-most ones of the finger springs 82 and preventing them from "collapsing" into the middle region between the inner-most finger springs 82.

Figure 7:
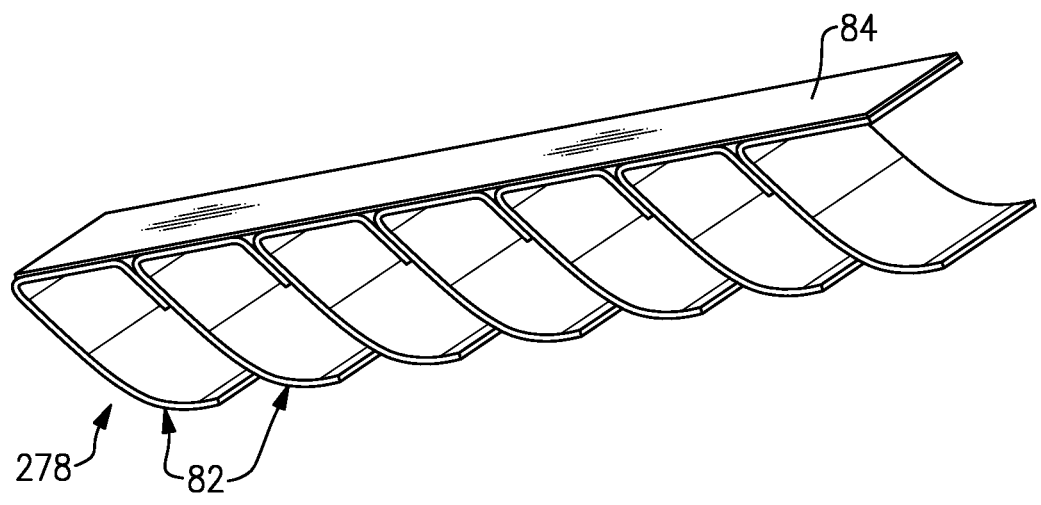
FIG. 7 illustrates a spring device in which the finger springs are commonly oriented.

FIG. 7 illustrates another example of a spring device 278. In this example, rather than the two groups of oppositely-oriented finger springs 82, the spring device 278 includes a single group of commonly-oriented finger springs 82. Here, although the finger springs 82 still nest as discussed above, the rotational stabilization may be somewhat less than in the two-group configuration because there are no back-to-back finger springs 82 for load cancellation. Thus, the loads here may ultimately be borne at the end of the slot 80. In that regard, the end of the slot 80 may be adapted to support the last finger spring 82, such as with an angled face.

Figure 8:
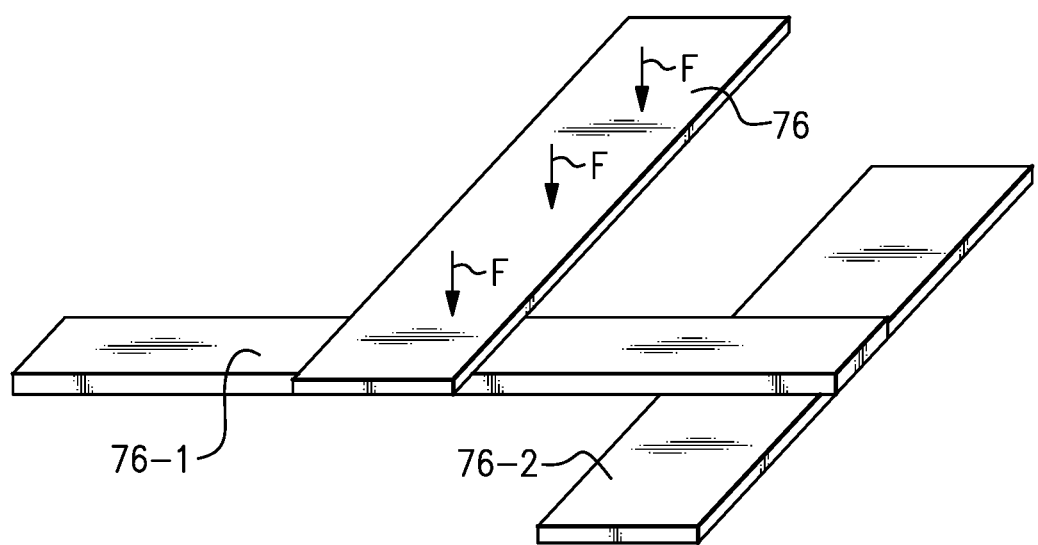
FIG. 8 illustrates use of the biasing force of a spring decide to bias adjacent seals.

As illustrated in FIG. 8, the biasing force provided by the spring devices disclosed herein may also be used to facilitate positioning of adjacent seals. For instance, seal 76 is biased with force F by a spring device as disclosed herein. A portion of an adjacent seal 76-1 underlaps the seal 76. Thus, the bias force applied to the seal 76 is transmitted also to the adjacent seal 76-1 to thereby provide a secondary bias force to facilitate maintaining the seal 76-1 in position. The secondary bias force applied to the seal 76-1 may also be used to provide a tertiary bias force. For instance, another adjacent seal 76-2 underlaps the seal 76-1. Thus, the bias force applied to the seal 76-1 is transmitted also to the adjacent seal 76-2 to thereby provide a tertiary bias force to facilitate maintaining the seal 76-2 in position. The types of the seals 76-1/76-2 are not particularly limited. For example, the seals 76-1/76-2 may be, but are not limited to, feather seals and L-seals.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An assembly comprising:
    first and second core gaspath walls, each of the core gaspath walls defining a core gas path side and a non-core gas path side, the first and second core gaspath walls being arranged next to each other and defining a gap therebetween;
    a seal arranged on the non-core gas path side, the seal bridging over the gap to seal the gap; and
    a spring device having a plurality of spring elements, the spring elements biasing the seal against the non-core gas path sides of the first and second core gaspath walls, wherein the spring elements are finger springs, each of the finger springs including a base portion, a finger portion, and an acute elbow portion connecting the base portion and the finger portion, and the base portion including a downturned tab that abuts the acute elbow portion of an adjacent one of the finger springs.

2. The assembly as recited in claim 1, wherein the finger portion is planar.

3. The assembly as recited in claim 1, wherein the finger portion includes a tip end having a bearing surface.

4. The assembly as recited in claim 1, wherein the finger springs are arranged as two oppositely-oriented groups.

5. The assembly as recited in claim 1, wherein the finger springs are arranged as a single, commonly oriented group.

6. The assembly as recited in claim 1, wherein the finger springs are bonded to a common backing plate.

7. The assembly as recited in claim 1, wherein the finger springs are rotationally self-constraining such that one of the finger springs rotationally constrains a next adjacent one of the finger springs.

8. The assembly as recited in claim 1, further comprising support hardware that defines a slot in which the spring device is disposed, the slot including a tang retaining the spring device.

9. The assembly as recited in claim 1, further comprising support hardware that defines a slot in which the spring device is disposed, the slot including a keystone element limiting rotation of the spring elements.

10. The assembly as recited in claim 1, further comprising an additional seal underlapping the seal such that the spring device biases the additional seal via the seal.

11. The assembly as recited in claim 1, wherein the first and second core gaspath walls are platforms of first and second airfoil fairings.

12. A gas turbine engine comprising:
    a compressor section;
    a combustor in fluid communication with the compressor section; and
    a turbine section in fluid communication with the combustor, the turbine section having a vane assembly disposed about a central axis of the gas turbine engine, the vane assembly includes:
        first and second airfoil fairings, each of the first and second airfoil fairings having a fairing platform and an airfoil extending therefrom, each of the fairing platforms defining a core gas path side and a non-core gas path side, the first and second airfoil fairings being arranged next to each other such that the fairing platforms define a gap therebetween,
        a seal arranged on the non-core gas path side, the seal bridging over the gap to seal the gap, and
        a spring device having a plurality of spring elements, the spring elements biasing the seal against the non-core gas path sides of the airfoil fairings, wherein the spring elements are finger springs, each of the finger springs including a base portion, a finger portion, and an acute elbow portion connecting the base portion and the finger portion, and the finger springs are arranged in a first group in which the acute elbow portions open in a first direction and a second group in which the acute elbow portions open in a second direction that is opposite the first direction.

13. The gas turbine engine as recited in claim 12, wherein the base portion includes a downturned tab that abuts the acute elbow portion of an adjacent one of the finger springs, and the finger portion includes a tip end having a bearing surface.

14. The gas turbine engine as recited in claim 13, wherein the finger springs are bonded to a common backing plate.

15. The gas turbine engine as recited in claim 12, wherein the finger springs are rotationally self-constraining such that one of the finger springs rotationally constrains a next adjacent one of the finger springs.

16. A spring device comprising:
    a plurality of finger springs, each of the finger springs including a base portion, a finger portion, and an acute elbow portion connecting the base portion and the finger portion, the base portion including a downturned tab that abuts the acute elbow portion of an adjacent one of the finger springs.

\* \* \* \* \*